United States Patent
Gibson

(10) Patent No.: US 7,684,431 B1
(45) Date of Patent: Mar. 23, 2010

(54) SYSTEM AND METHOD FOR ARBITRATION IN A PACKET SWITCH

(75) Inventor: David Gibson, Suwanee, GA (US)

(73) Assignee: Integrated Device Technology, Inc., San Jose, CA (US)

(*) Notice: Subject to any disclaimer, the term of this patent is extended or adjusted under 35 U.S.C. 154(b) by 978 days.

(21) Appl. No.: 11/407,321

(22) Filed: Apr. 18, 2006

Related U.S. Application Data

(60) Provisional application No. 60/672,349, filed on Apr. 18, 2005.

(51) Int. Cl.
*H04L 12/56* (2006.01)

(52) U.S. Cl. ........................ 370/461; 370/462

(58) Field of Classification Search ......... 370/412–418, 370/389, 390, 427, 395.1, 396, 229, 230, 370/230.1, 231, 235, 400, 401, 461, 462; 710/35
See application file for complete search history.

(56) References Cited

U.S. PATENT DOCUMENTS

| | | | | |
|---|---|---|---|---|
| 4,473,880 A | * | 9/1984 | Budde et al. | 710/112 |
| 4,932,028 A | | 6/1990 | Katircioglu et al. | |
| 4,987,529 A | * | 1/1991 | Craft et al. | 710/113 |
| 4,991,171 A | | 2/1991 | Teraslinna | |
| 5,229,991 A | | 7/1993 | Turner | |
| 5,276,684 A | * | 1/1994 | Pearson | 370/438 |
| 5,305,311 A | | 4/1994 | Lyles | |
| 5,440,546 A | | 8/1995 | Bianchini, Jr. | |
| 5,710,549 A | * | 1/1998 | Horst et al. | 710/40 |
| 5,764,927 A | * | 6/1998 | Murphy et al. | 710/105 |
| 5,999,981 A | | 12/1999 | Willenz | |
| 6,044,085 A | * | 3/2000 | Horlander | 370/450 |
| 6,098,110 A | * | 8/2000 | Witkowski et al. | 709/249 |
| 6,134,229 A | | 10/2000 | Schwaller et al. | |
| 6,377,782 B1 | | 4/2002 | Bishop et al. | |
| 6,389,479 B1 | | 5/2002 | Boucher et al. | |
| 6,598,179 B1 | | 7/2003 | Chirashnya et al. | |
| 6,625,121 B1 | * | 9/2003 | Lau et al. | 370/230 |
| 6,633,578 B1 | | 10/2003 | Matsumaru et al. | |
| 6,661,788 B2 | * | 12/2003 | Angle et al. | 370/390 |

(Continued)

FOREIGN PATENT DOCUMENTS

WO 0239667 5/2002

OTHER PUBLICATIONS

RapidIO: An Embedded System Component Network Architecture, Feb. 22, 2000, Motorola.

(Continued)

*Primary Examiner*—Pankaj Kumar
*Assistant Examiner*—Duc T Duong
(74) *Attorney, Agent, or Firm*—Molly Sauter; Kenneth Glass; Glass & Associates

(57) ABSTRACT

A packet switch arbitration system and method for arbitration in a packet switch. In one aspect, a method of issuing grants to an ingress port is disclosed in which a first grant request and burst signal are activated at an ingress port having more than one word available for transfer through the switch. A first grant is issued to the ingress port on a first interval. A subsequent grant is issued to the ingress port on a subsequent interval, where the subsequent grant is issued before the ingress port has validated the first grant request.

37 Claims, 3 Drawing Sheets

U.S. PATENT DOCUMENTS

| | | | |
|---|---|---|---|
| 6,662,339 | B1 | 12/2003 | Lanemann et al. |
| 6,675,325 | B1 | 1/2004 | Garney et al. |
| 6,678,279 | B1 | 1/2004 | Meredith |
| 6,804,237 | B1 | 10/2004 | Luo |
| 6,882,649 | B1 * | 4/2005 | Gura et al. ............ 370/395.42 |
| 6,937,133 | B2 | 8/2005 | Johnson et al. |
| 6,954,463 | B1 | 10/2005 | Ma et al. |
| 6,954,811 | B2 | 10/2005 | Vishnu |
| 6,963,576 | B1 | 11/2005 | Lee |
| 6,975,651 | B1 | 12/2005 | Ono et al. |
| 7,006,501 | B1 * | 2/2006 | Gura et al. ............ 370/395.42 |
| 7,020,161 | B1 * | 3/2006 | Eberle et al. ................ 370/468 |
| 7,023,840 | B2 * | 4/2006 | Golla et al. ................. 370/360 |
| 7,027,443 | B2 | 4/2006 | Nichols |
| 7,058,789 | B2 | 6/2006 | Henderson et al. |
| 7,106,742 | B1 | 9/2006 | Frisch et al. |
| 7,224,671 | B2 * | 5/2007 | Lee et al. .................... 370/235 |
| 7,260,120 | B2 | 8/2007 | Kang et al. |
| 2001/0014105 | A1 | 8/2001 | Tezuka et al. |
| 2001/0020266 | A1 | 9/2001 | Kojima et al. |
| 2002/0085550 | A1 | 7/2002 | Rhodes |
| 2002/0141256 | A1 | 10/2002 | Barri et al. |
| 2003/0110206 | A1 | 6/2003 | Osokine |
| 2003/0147394 | A1 | 8/2003 | Jennings et al. |
| 2004/0153835 | A1 | 8/2004 | Song et al. |
| 2004/0184466 | A1 | 9/2004 | Chang et al. |
| 2005/0058127 | A1 | 3/2005 | Munter et al. |
| 2005/0111434 | A1 | 5/2005 | Halen |
| 2005/0232201 | A1 | 10/2005 | Bysted et al. |
| 2005/0249244 | A1 | 11/2005 | McNamara et al. |
| 2006/0007885 | A1 | 1/2006 | Pollack et al. |
| 2006/0050738 | A1 | 3/2006 | Carr et al. |
| 2006/0128436 | A1 | 6/2006 | Doi et al. |
| 2006/0248377 | A1 | 11/2006 | Tezcan et al. |
| 2006/0251069 | A1 | 11/2006 | Cathey et al. |
| 2007/0072646 | A1 | 3/2007 | Kuwahara et al. |
| 2007/0124554 | A1 | 5/2007 | Allen et al. |
| 2007/0242599 | A1 | 10/2007 | Gorday et al. |
| 2008/0219235 | A1 | 9/2008 | Ma et al. |
| 2008/0298492 | A1 | 12/2008 | Hwang et al. |

OTHER PUBLICATIONS

RFC: 791, DARPA Internet Program Protocol Specification, Sep. 1981, Information Science Institute.

802.11 standard, Aug. 21, 2002, http://wlan.nat.sdu.dk/802_11standard.htm.

History of the I2C Bus, Circa 2000, ESAcademy.

International Search Report, PCT/US2006/013767, Jul. 31, 2006.

"Solano Communications IC: A High-Throughput Solution for 3G Wireless and Broadband Base Stations," Spectrum Wireless Systems, Admitted Prior Art, 4 pages.

"Tsi568A: Serial RapidIO Switch," Tundra Semiconductor Corp., Printed From Internet Feb. 17, 2005, 4 pages.

"RapidIO: An Embedded System Component Network Architecture," Architecture and Systems Platforms, Motorola Semiconductor Product Sector, Feb. 22, 2000, 25 pages.

Bertan Tezcan and Bill Beane, "How to achieve low-cost, reusable wireless infrastructure through modular baseband design," Wireless Net DesignLine, Aug. 8, 2006, available at http://www.wirelessnetdesignline.com.

Bertan Tezcan and Bill Beane, "Achieving modular wireless infrastructure design: A compelling look at benefits supporting connectivity amongst DSPs, FPGAs, or ASICs," OpenSystems Publishing, Sep. 22, 2006, available at http://www.dsp-fpga.com/articles/tezcan_and_beane.

Bertan Tezcan and Bill Beane, "Modular baseband design—Enabling a low-cost reusable wireless infrastructure(Part I)," Portable Design Online Article, Feb. 15, 2007, previously available at http://pd.pennnet.com.

Bertan Tezcan and Bill Beane, "Modular baseband design—Enabling a low-cost reusable wireless infrastructure(Part II)," Portable Design Online Article, Feb. 15, 2007, previously available at http://pd.pennnet.com.

Lukas Sekanina and Vladimir Drabek, "Theory and Applications of Evolvable Embedded Systems,"Proceedings of the 11th IEEE International Conference and Workshop on the Engineering of Computer-Based Systems (ECBS'04), 2004.

"Cisco MDS 9020 Fabric Switch Configuration Guide and Command Reference, Release 2.x," pp. 10-1 through 10-4, Cisco Systems, Inc., Jun. 2005.

Peter J. Welcher, "Configuring SNMP on Switches, and Syslog," Jun. 24, 1999.

"RapidIO Interconnect Specification, Part 8, Error Management, Extensions Specification," RapidIO Trade Association, Jun. 2005.

\* cited by examiner

SYSTEM AND METHOD FOR ARBITRATION IN A PACKET SWITCH

The present application claims benefit of U.S. Provisional Patent Application Ser. No. 60/672,349, filed Apr. 18, 2005, entitled "Packet Processing Switch and Methods of Operation Thereof," which is incorporated herein by reference in its entirety; the present application is related to co-pending U.S. patent application Ser. No. 11/395,575, filed Mar. 31, 2006, entitled "Combined Packet Processor and RIO Switch on Single Chip for DSP Clustered Applications," which is incorporated herein by reference in its entirty; co-pending U.S. patent application Ser. No. 11/394,886, filed Mar. 31, 2006, entitled "Allocating Destination Addresses to a Switch to Perform Packet Processing on Selected Packets with Corresponding Destination Address," which is incorporated herein by reference in its entirty; co-pending U.S. patent application Ser. No. 11/395,570, filed Mar. 31, 2006, entitled "Performing Packet Manipulation Options to Transform Packet Data to a Format More Compatible with Processor," which is incorporated herein by reference its entirety; co-pending U.S. patent application Ser. No. 11/383,121, filed on May 12, 2006, entitled "Error Management System and Method for a Packet Switch," co-pending U.S. patent application Ser. No. 11/383,165, filed on May 12, 2006, entitled "Packet Processing in a Packet Switch with improved output data distribution," and co-pending U.S. patent application Ser. No. 11/383,150, filed on May 12, 2006, entitled "System and Method of Constructing Data Packets in a Packet Switch".

BACKGROUND OF THE INVENTION

Modern telecommunication networks include packet switching networks for transmitting data from a source device to a destination device. The data is split up and encapsulated into data packets along with a destination address of the data. The packet switching network individually routes each data packet through a network of interconnected packet switches based on the destination address in the data packet. The data packets may be routed through different paths in the packet switching network and generally arrive at the destination device in an arbitrary order. At the destination device, the data is reconstructed from the data packets.

Conventional packet switches receive data packets, including a header indicating a desired destination egress port for the data packet, and generate and transmit to the central arbiter a request for a connection to the corresponding egress port. The central arbiter performs, in each of a number of clock cycles, an arbitration process to arbitrate among the requests it receives and determine which of the ingress ports will have access to the switch. Switch ingress ports typically request switch access for a predetermined block of switch bandwidth. Before a second block of bandwidth can be granted access by the arbiter, the original grant must be issued, the ingress port's grant request status must be updated based on receipt of the issued grant and a new grant request must be propagated through the switch's grant request processing pipeline and be selected for servicing. This process typically takes a number of clock cycles, thereby limiting the frequency with which a single ingress port can receive issued grants. Consequently, idle switch bandwidth blocks can be introduced which reduces the effective bandwidth of the switch and increases the latency between when data is presented to the switch and when it exits the switch.

In light of the above, a need exists in the art for a system and method that will allow grants to be issued to a single ingress port at any frequency, including on consecutive clock cycles, regardless of the grant request processing latency of the packet switch. Additionally, a need exists in the art for a system and method to insure that, even when grants are being issued at a high frequency, the grants are only issued to ports with sufficient data available to make use of the received grants.

SUMMARY OF THE INVENTION

In accordance with the present invention, a method of issuing grants to an ingress port in a packet switch is provided. In one embodiment, when an ingress port has more than one word available for transfer through the switch, along with a first grant request, a burst signal is activated. A first grant is issued to the ingress port on a first interval. When the burst signal is activated, a subsequent grant may be issued to the ingress port on a subsequent interval, wherein the subsequent grant is issued before the ingress port has had an opportunity to validate the first grant request. By allowing a subsequent grant to issue before the ingress port has had an opportunity to validate the first grant request, switch latency is reduced.

In one embodiment the burst signal at the ingress port has a burst length equal to the number of words available for transfer at the ingress port. The burst signal can be programmed to become active when 2, 3, or any number of words is available for transfer through the switch. Accordingly, the burst length may be equal to two or three, or may additionally be matched to the latency of the grant request pipeline. By matching the burst length to the latency of the grant request pipeline, it becomes possible to receive a continuous stream of grants to the single ingress port.

Validating the first grant request at the ingress port includes receiving the first issued grant at the ingress port and reactivating the grant request at the ingress port. In a typical switch validation process, the ingress ports having a word available for transfer through the switch notifies the arbiter by activating a grant request line. The activated grant request lines from all the ingress ports form an arbitration pool and the arbiter selects an ingress port from among the grant requests in the arbitration pool and issues a grant to the selected ingress port. In a common switch, once an ingress port has been issued a grant, it is removed from the arbitration pool and cannot receive another grant until enough cycle time has passed to update the grant request line at that port. By contrast, with the present invention, an active burst signal allows the ingress port to stay in the arbitration pool even after it has been issued a grant request. With the present invention, the issuing of a subsequent issued grant is not dependent upon the validation status of the ingress port. As such, the arbiter does not have to wait for the ingress port to receive the issued grant and reactivate the grant request line before issuing subsequent grants to the same ingress port.

In an additional embodiment, when there is only one word remaining at the ingress port to be transferred to the switch, the burst signal is deactivated to indicate to the arbiter that multiple words are no longer available at this ingress port. Additionally, when there are zero words available at an ingress port, both the burst signal and the grant request signal are deactivated.

In an additional embodiment of the present invention, a method of issuing grants is disclosed that includes activating at least one grant request from at least one of a plurality of ingress ports. For each of the ingress ports having an activated grant request, a burst signal is activated at the ingress port when the ingress port has a plurality of packet words available for transfer through the switch. Next, arbitrating among the grant requests on a first interval a first winning ingress port is determined and a first grant is issued to the first winning ingress port. If the burst signal is activated on this winning ingress port, thereby indicating that more than one word is available for transfer through the switch, then this winning ingress port is not removed from the arbitration pool and can therefore be selected on a subsequent arbitration. Then, arbitrating among the grant requests on a subsequent interval a subsequent winning ingress port is determined. If the subsequent winning ingress port is the first winning ingress port, a subsequent grant is issued to the subsequent winning ingress port, wherein the subsequent grant is issued prior to the winning ingress port validating the first grant that was issued to the first winning ingress port.

The grant requests that are activated at the ingress ports include information indicating at least one egress port to which a connection is required through the switch and a packet priority. The packet priority is then used during the arbitration among the ingress ports to determine which of the ports will receive the grant. In a particular embodiment, the ingress port with the highest packet priority will receive the grant.

In an additional embodiment, when more than one ingress port has the same packet priority, the winning ingress port and the subsequent winning ingress port is determined by a round robin arbitration methodology that is commonly known in the art for switch arbitration.

In an additional embodiment of the present invention, a system for issuing grants to an ingress port in a switch is provided that includes an ingress port having control logic for activating a first grant request and activating a burst signal when the ingress port has more than one word available for transfer through the switch. The system includes an arbiter having control logic for issuing a first grant to the ingress port on a first interval and for issuing a subsequent grant to the ingress port on a subsequent interval, where the subsequent grant issued before the ingress port has validated the first grant request.

In another embodiment when a plurality of ingress ports are requesting access to the switch, a system for issuing grants to an ingress port of a switch includes at least one of the plurality of ingress ports having control logic to activate at least one grant request and for each of the ingress ports having an activated grant request, and to activate a burst signal at the ingress port when the ingress port has a plurality of packet words available for transfer through the switch. The system also includes an arbiter having control logic for arbitrating among the grant requests on a first interval to determine a first winning ingress port and issuing a first grant to the first winning ingress port and arbitrating among the grant requests on a subsequent interval to determine a subsequent winning ingress port. If the subsequent winning ingress port is the first winning ingress port and the burst signal for the first winning ingress port is activated, a subsequent grant is issued to the subsequent winning ingress port wherein the subsequent grant is issued prior to the winning ingress port validating the first grant that was issued to the first winning ingress port.

In an additional embodiment, the system in accordance with the present invention includes an input state machine positioned between the receive buffer and the ingress ports of the switch, the input state machine having control logic to determine if a word presented by the receive buffer is serviceable by the switch.

As such, according to the system and method of the present invention, an ingress port selected on a first interval by the arbiter to receive a grant can again be selected on a subsequent interval to receive a subsequent grant without having to wait for the ingress port to update the grant request signal.

Accordingly, the present invention provides for a system and method that will allow grants to be issued to a single ingress port at any frequency, including on consecutive clock cycles, regardless of the grant request processing latency of the packet switch, without running the risk of issuing grants to ingress ports with insufficient data available to honor that grant

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

A packet switch in accordance with the present invention routes packets from ingress ports to egress ports without modifying them. Typically, ingress ports for the switch are driven by receive ports of the device, also called source ports. Likewise, egress ports for the switch typically drive transmit ports of the device, also called destination ports. The switch is able to receive packet data at the ingress ports, buffering it until it can be transmitted through the switch. Also, it should be able to handle conditions when the buffer fills and when the element driving the ingress port aborts transfer of a packet after it has begun. The switch can arbitrate among the various ingress ports for access to the switch, insuring that the desired egress port(s) is (are) ready to accept a packet of the given priority before it is submitted to the switch. In a specific embodiment, the switch arbitration also insures that the packet ordering requirements of the RapidIO specification are honored. In addition, the switch stores data at the egress port until full packets have been accumulated. Packets are then transferred to the destination port when requested to do so by the port.

Figure 1:
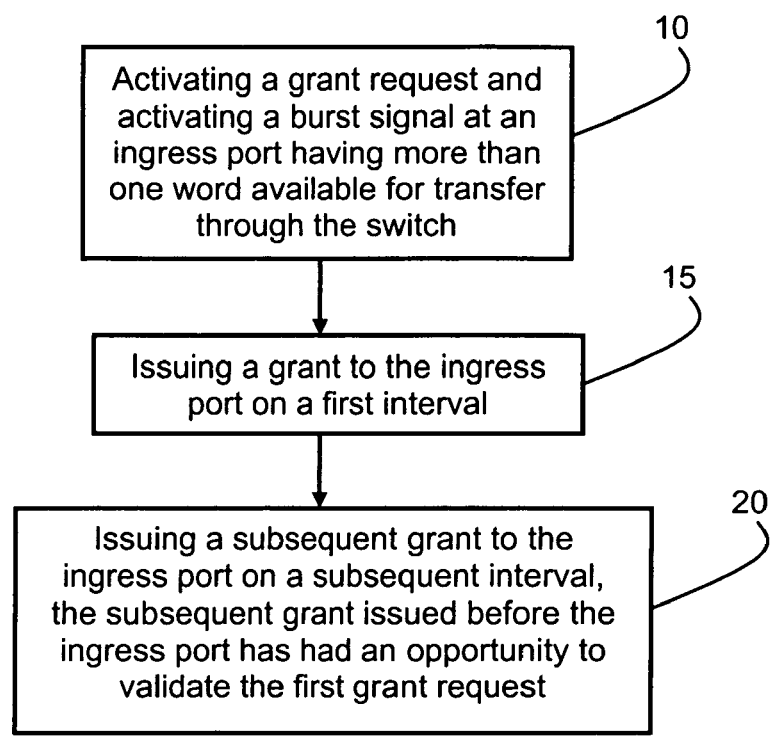
FIG. 1 is a flow diagram illustrating a method in accordance with an embodiment of the present invention.

With reference to FIG. 1, in a specific embodiment of the present invention, a method of issuing grants to an ingress port in a packet switch that includes a plurality of ingress ports is provided. In a specific embodiment, the method includes activating a first grant request and activating a burst signal at an ingress port that has more than one word available for transfer through the switch 10. A first grant is issued to the ingress port on a first interval 15 and a subsequent grant is issued to the ingress port on a subsequent interval, wherein the subsequent grant is issued before the ingress port has had an opportunity to validate the first grant request 20. In accordance with the present invention, validating the first grant request 20 involves receiving the issued grant and updating the grant request signal at the ingress port.

In a particular embodiment the burst signal is activated when there are two words available at the ingress port. In an additional embodiment, the burst signal is activated when there are three words available at the ingress port. The burst signal at the ingress port has a burst signal length equal to the number of words available for transfer at the ingress port. As such, the burst signal can be programmed to become active when 2, 3, or any number of words are available for transfer through the switch. Accordingly, the burst length may be equal to two or three, or may additionally be matched to the latency of the grant request pipeline. By matching the burst length to the latency of the grant request pipeline, it becomes possible to receive a continuous stream of grants to the single ingress port. When a number of words less than the burst length remains at the ingress port to be transferred to the switch, the burst signal is deactivated.

In an additional embodiment, the burst length is configurable to be adjusted based on system conditions and may be programmed to be less than the grant request pipeline latency.

Figure 2:
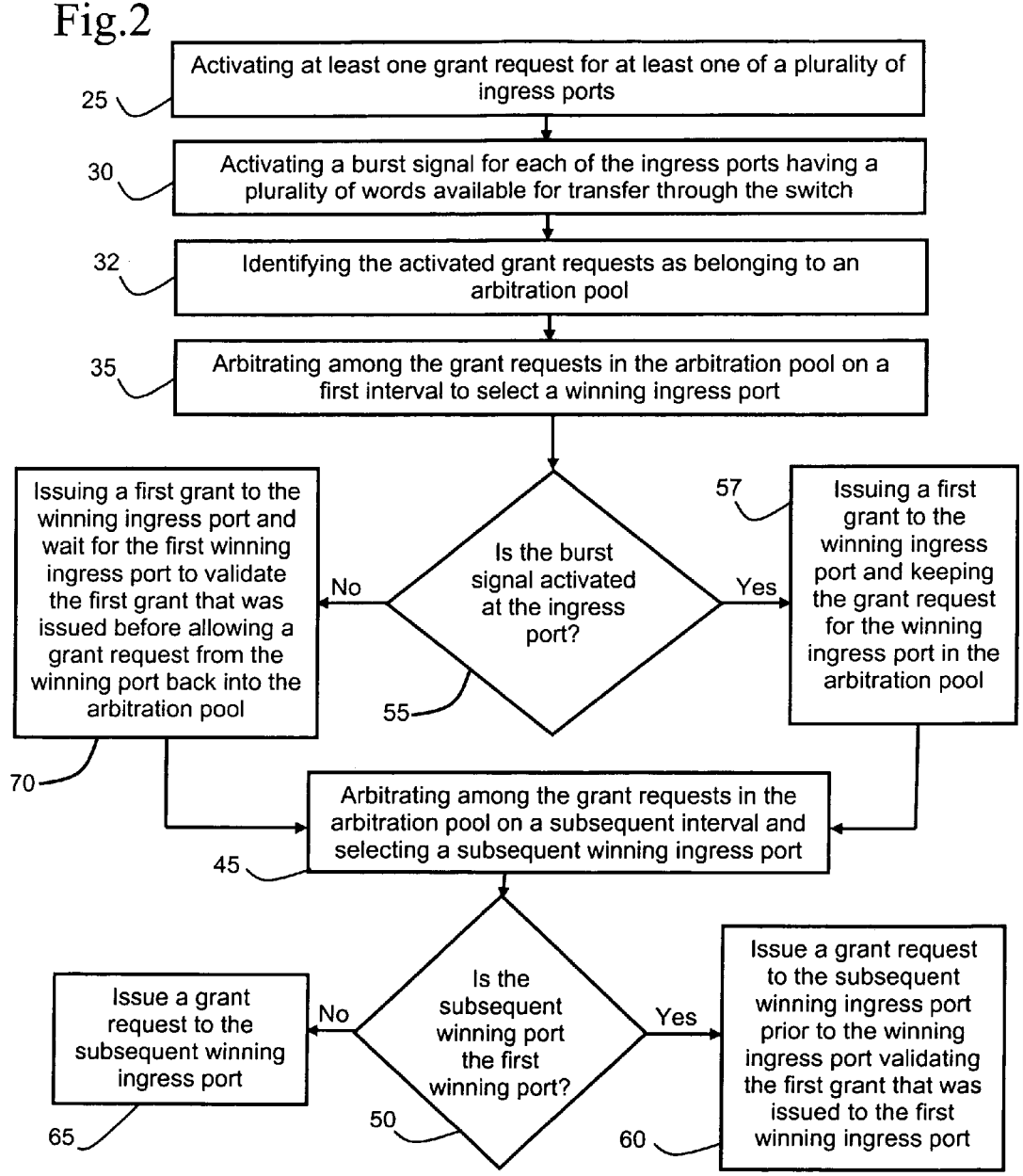
FIG. 2 is a flow diagram illustrating a method in which multiple ingress ports are requesting access to the switch in accordance with an embodiment of the present invention.

With reference to FIG. 2, an embodiment of the method in accordance with the present invention is illustrated wherein multiple ingress ports are requesting access to the switch. The method includes activating at least one grant request from at least one of the plurality of ingress ports 25. These grant requests are identified by the arbiter as being in an arbitration pool of requests available for selection by the arbiter 32. For each of the ingress ports having an activated grant request, a burst signal is activated at the ingress port when the ingress port has a plurality of packet words available for transfer through the switch 30. The next step includes arbitrating among the grant requests in the arbitration pool on a first interval to determine a first winning ingress port 35. If the arbiter selects an ingress port that has an active burst signal 55, then that ingress port is the first winning ingress port and the grant request for that ingress port remains in the arbitration pool and is available for subsequent grant issues 57. However, if the arbiter selects a winning ingress port that does not have an active burst signal 55, then the grant request for that ingress port is removed from the arbitration pool and in unavailable until the grant request line has time to update 70. A next step includes arbitrating among the grant requests in the arbitration pool on a subsequent interval to determine a subsequent winning ingress port 45. If the subsequent winning ingress port is the first winning ingress port 50 and the burst signal for the first winning ingress port is activated 55, a subsequent grant is issued to the subsequent winning ingress port wherein the subsequent grant is issued prior to the winning ingress port validating the first grant that was issued to the first winning ingress port 60. In a specific embodiment of the invention, the first interval and the subsequent interval coincide with the clock cycles of the switch, however other intervals, which may or may not coincide with a specific clock cycle of the system, are within the scope of the present invention. If the subsequent winning ingress port is not the first winning ingress port 50, then the subsequent grant is issued to the subsequent winning ingress port 65. If the subsequent winning ingress port is the first winning ingress port 50, but the burst signal for the subsequent winning ingress port is not active 55, then the arbiter must wait for the winning ingress port to validate the first grant request before issuing a subsequent grant request 70.

The ingress ports to the switch provide the arbiter with information regarding the egress port to which a connection is required through the switch and the priority of the packet. The packet priority is used during arbitration to determine which ingress port will have access to the switch. Packets with higher priority are selected before packets with a lower priority. Only one ingress port may receive a grant in a single cycle. If multiple ingress ports simultaneously request access to the switch, the only those ingress ports with the highest priority will be considered. If there is more than one ingress port with the same priority requesting access to the switch, then the arbiter cycles through the requests in a round robin fashion. When there are no more requests of that highest priority, the arbiter will drop down to the next highest priority and perform a similar round robin. If higher priority requests appear in the pipeline, then the serviced priority changes again to the new higher priority, so that on every cycle the arbiter is servicing only those requests of the highest priority. Accordingly, words from packets with different priorities can be interleaved as they go through the switch if the higher priority packet's ingress port has to wait to receive additional words. This insures maximum utility of the switch, and consequently maximum throughput of the data.

Figure 3:
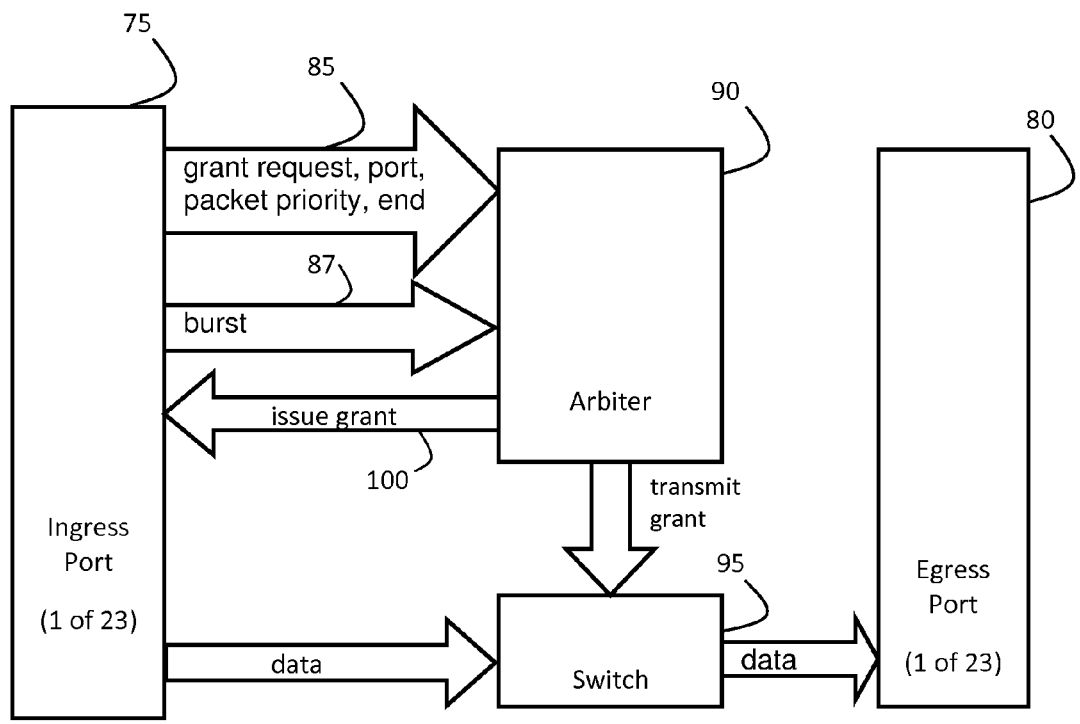
FIG. 3 is a diagrammatic view of a system in accordance with an embodiment of the present invention.

With reference to FIG. 3, in a particular embodiment, the switch implementation includes twenty-three ingress 75 and egress ports 80, twenty-two of which are external and one of which is internal and used to support maintenance packets. The number of ingress ports and egress port is not intended to be limiting and any number of ports are within the scope of the present invention.

In the current state of the art, a grant request 85 is presented to the arbiter 90 by an ingress port 75, also referred to as a receive buffer, when the ingress port has data to be transmitted through the switch 95. As such, when an ingress port 75 has data available, a grant request 85 is placed in a pool of requests to be considered by the arbiter 90. When a grant is issued 100 to an ingress port 75, the arbiter 90 is granting permission for that ingress port 75 to access the switch 95 for one clock cycle so that a single 32-bit word may be transmitted. Once a grant request has been honored by the arbiter, that ingress port must be removed from the pool of requests considered for arbitration until such time as is required for it to update the grant request line has passed. There is typically a delay between the time a grant request 85 is activated at an ingress port 75 and when it is serviced by the actual issuing of a grant 100 by the arbiter 90. Once a grant is issued 100, the arbiter 90 must wait until the ingress port 75 has processed the grant 100 and updated its grant request signal 85 before allowing a second grant from the same ingress port 75 to enter the grant request arbitration pool.

The present invention utilizes a second signal, herein referred to as a "burst" signal, to indicate to the arbiter that multiple words of a packet are ready to move through the switch. The burst signal 87 is activated along with the grant request 85 sent from the ingress port 75 to the arbiter 90. With the burst signal 87 in accordance with the present invention, the central arbiter 90 no longer has to wait for the response to the initial grant before issuing subsequent grants. An active burst signal 87 at an ingress port 75 indicates that issuance of a grant from the arbiter to the ingress port 100 will not cause the grant request signal to disappear upon receipt of the grant, so that the arbiter does not have to wait for the grant feedback loop to be traversed again before issuing subsequent grants to the same port. Accordingly, an active burst signal 87 at an ingress port allows the grant request from the ingress port to remain in the arbitration pool even after it has been issued a grant. As such, even after issuing a grant 100, the arbiter 90 can continue to process grant requests 85 already in the grant request pool from the same ingress port 75 with confidence that the ingress port 75 can service those additional requests. As such, the ingress port 75, or receive buffer, includes control logic to activate a burst signal when multiple words are available at the ingress port 75 and the arbiter 90 includes control logic to interpret the burst signal 87 and issue a subsequent grant to the same ingress port without having to recheck the grant request signal for that ingress port. As such, the burst signal in accordance with the present invention allows the grant request to stay in the arbitration pool, even after it has been honored once by the arbiter.

Only one ingress port may receive a grant in a single cycle. If multiple ingress ports simultaneously request access to the switch, then only those ports with the highest priority data will be considered. If there is more than one port with the highest priority data packet requesting access to the switch, then the arbiter cycles through the requests in a round robin fashion. When there are no more requests of that highest priority, the arbiter will drop down to the next highest priority and perform a similar round robin. If higher priority requests appear in the pipeline, then the serviced priority changes again to the new higher priority, so that on every cycle the arbiter is servicing only those requests of the highest priority. Accordingly, words from packets with different priorities can be interleaved as they go through the switch if the higher priority packet's ingress port is having to wait to receive additional words. This insures maximum utility of the switch, and consequently maximum throughput of the data.

In a specific embodiment, the ingress port requests a grant by bringing its request signal high. Additionally, the ingress port sends a packet priority along with the grant request. A burst signal is sent from the receive buffer if more than one word is ready to transmit and an end signal is sent if the word to be sent is the last word in the packet.

In an exemplary embodiment of the present invention, ingress port A has more than one word available for transfer through the switch. According to the present invention, ingress port A activates a grant request and a burst signal to indicate to the arbiter that it has more than one word available. Ingress port A additionally sends a packet priority. On a first clock cycle, the arbiter evaluates each of the ingress ports of the switch to determine, based on packet priority, which of the ingress ports will have access to the switch. Assuming that ingress port A has the highest priority among the ingress ports that have requested a grant, and no other ports have the same priority, ingress port A is issued a grant. On a second clock cycle, the arbiter evaluates the ingress ports again. If ingress port A no longer has the highest priority, it is not issued a grant. However, if ingress port A continues to have the highest priority and is the only port requesting a grant, then the arbiter issues another grant to ingress port A without having to wait until the grant request for ingress port A is updated.

If ingress port A was not issued a grant on the second clock cycle, it is possible that by the time the arbiter evaluates the ingress ports on the third clock cycle, ingress port A will have had time to update its grant request. The time required to update the grant request for the ingress port is dependent upon the latency of the switch.

In an additional embodiment, additional advantages can be gained by employing multiple burst signals in the present invention. This embodiment would further reduce the number of unusable grants issued. In an exemplary embodiment, in a system with two burst signals, one signal could indicate an ingress port having more than two words available, herein referred to as burst2, another burst signal could be used to indicated a port having more than 3 words available, herein referred to as burst3. When only the grant request signal is high, issuing a single grant to an ingress port would be effective in removing the port from the pool. However, when the grant request and burst2 are high, then issuing 2 grants to the ingress port before the control signals for the ingress port can be updated would remove the port from the pool. If all three signals from the ingress port, i.e., grant request signal, burst2 and burst3 were high, then three grants could be issued before removing a port from the pool. Accordingly, in systems which alternate between situations with a single port requesting all the bandwidth and a number of different ports requesting bandwidth, this embodiment could significantly reduce the number of unserviceable grants issued. Logical extensions of this for a system with N cycles of latency between issuing grants and updating requests (conceivably as high as 4, 5, or even 6 cycles) would be the use of N signals, where bits 1 through M are high if there are M words available, and the use of X signals, where X is a binary number indicating the number of words available such that $2^X >= N$.

Although specific embodiments of the invention have been disclosed, it will be understood by those having ordinary skill in the art that changes can be made to the specific embodiments without departing from the spirit and scope of the invention. Additionally, many modifications may be made to adapt a particular situation to the teachings of the present invention without departing from the central inventive concepts described herein. Furthermore, an embodiment of the present invention may not include all of the features described above. The scope of the invention is not to be restricted, therefore, to the specific embodiments, and it is intended that the appended claims cover any and all such applications, modifications, and embodiments within the scope of the present invention.

What is claimed is:

1. A method of issuing grants to an ingress port in a switch comprising a plurality of ingress ports, the method comprising:

placing a first grant request into an arbitration pool and activating a burst signal at an ingress port, the first grant request placed into the arbitration pool to indicate that the ingress port is requesting access to the switch for one clock cycle to transmit a single word, and the activated burst signal indicating that the ingress port has more than one word available for transfer through the switch;

issuing a first grant to the ingress port on a first interval thereby granting permission for the ingress port to access the switch for one clock cycle to transmit the single word;

retaining the first grant request in the arbitration pool after the first grant has been issued in response to the activated burst signal; and issuing a subsequent grant to the ingress port on a subsequent interval, the subsequent grant issued before the ingress port has validated the first grant request.

2. The method of claim 1, wherein the burst signal at the ingress port has a burst length equal to the number of words available for transfer at the ingress port.

3. The method of claim 2, wherein the burst length is equal to two.

4. The method of claim 2, wherein the burst length is greater than two.

5. The method of claim 1, wherein validating the first grant request further comprises receiving the first issued grant at the ingress port and reactivating the grant request at the ingress port.

6. The method of claim 1, further comprising deactivating the burst signal at the ingress port when only one word is available at the ingress port for transfer through the switch.

7. A method of issuing grants to an ingress port in a switch comprising a plurality of ingress ports and a plurality of egress ports, the method comprising:
   activating at least one grant request from at least one of the plurality of ingress ports, the grant request indicating that the ingress port is requesting access to the switch for one clock cycle to transmit a single word and for each of the ingress ports having an activated grant request, further activating a burst signal at the ingress port, and the activated burst signal indicating that the ingress port has a plurality of packet words available for transfer through the switch;
   identifying the activated grant requests as belonging to an arbitration pool to be considered for selection by the arbiter;
   arbitrating among the grant requests in the arbitration pool on a first interval to determine a first winning ingress port; and
   issuing a grant to the first winning ingress port thereby granting permission for the ingress port to access the switch for one clock cycle to transmit the single word and retaining the grant request from the first winning ingress port in the arbitration pool after the grant to the first winning ingress port has been issued if the burst signal at the winning ingress port is activated, or removing the grant request from the first winning ingress port from the arbitration pool after the grant to the first winning ingress port has been issued if the burst signal at the winning ingress port is not activated.

8. The method of claim 7, further comprising the steps of:
   arbitrating among the grant requests in the arbitration pool on a subsequent interval to determine a subsequent winning ingress port; and
   if the subsequent winning ingress port is the first winning ingress port, issuing a subsequent grant to the subsequent winning ingress port wherein the subsequent grant is issued prior to the winning ingress port validating the first grant that was issued to the first winning ingress port.

9. The method of claim 8, wherein validating the first grant request further comprises receiving the issued grant at the winning ingress port and reactivating the grant request at the winning ingress port.

10. The method of claim 7, wherein the step of activating at least one grant request from at least one of the plurality of ingress ports further comprises activating a grant request indicating at least one egress port to which a connection is required through the switch and a packet priority.

11. The method of claim 7, wherein each of the grant requests further comprises a packet priority and wherein the first winning ingress port is the ingress port having the grant request with the highest packet priority.

12. The method of claim 7, wherein each of the grant requests further comprises a packet priority and wherein the first winning ingress port is the ingress port as determined by a round robin arbitration method among the grant requests having the same packet priority.

13. The method of claim 7, wherein each of the grant requests further comprises a packet priority and wherein the subsequent winning ingress port is the ingress port having the grant request with the highest packet priority.

14. The method of claim 7, wherein each of the grant requests further comprises a packet priority and wherein the subsequent winning ingress port is the ingress port as determined by a round robin arbitration method among the grant requests having the same packet priority.

15. The method of claim 7, wherein the burst signal at each of the ingress ports has a burst length equal to the number of words available for transfer at the ingress port.

16. The method of claim 15, wherein the burst length is equal to two.

17. The method of claim 15, wherein the burst length is greater than two.

18. The method of claim 7, further comprising deactivating the burst signal at each of the plurality of ingress ports when only one packet word is available at the ingress port for transfer through the switch.

19. A system for issuing grants to an ingress port in a switch comprising a plurality of ingress ports, the system comprising:
   an ingress port having control logic to activate a first grant request and to activate a burst signal, the first grant request indicating that the ingress port is requesting access to the switch for one clock cycle to transmit a single word, and the activated burst signal indicating that the ingress port has more than one word available for transfer through the switch;
   an arbiter having control logic for issuing a first grant to the ingress port on a first interval thereby granting permission for the ingress port to access the switch for one clock cycle to transmit the single word, for retaining the first grant request in the arbitration pool after the first grant has been issued in response to the activated burst signal and for issuing a subsequent grant to the ingress port on a subsequent interval, the subsequent grant issued before the ingress port has validated the first grant request.

20. The system of claim 19, further comprising an input state machine positioned between the receive buffer and the ingress port of the switch, the input state machine having control logic to determine if a word presented by the receive buffer is serviceable by the switch.

21. The system of claim 19, wherein the burst signal at the ingress port has a burst signal length equal to the number of words available for transfer at the ingress port.

22. The system of claim 21, wherein the burst signal length is equal to two.

23. The system of claim 21, wherein the burst signal length is greater than two.

24. The system of claim 19, wherein validating the first grant request further comprises receiving the first issued grant at the ingress port and reactivating the grant request at the ingress port.

25. The system of claim 19, further comprising the ingress port for deactivating the burst signal when only one word is available at the ingress port for transfer through the switch.

26. A system for issuing grants to an ingress port in a switch comprising a plurality of ingress ports and a plurality of egress ports, the system comprising:
   a plurality of ingress ports having control logic, wherein the control logic of at least one of the plurality of ingress ports activates at least one grant request to be placed in an arbitration pool, the grant request placed into the arbitration pool to indicate that the ingress port is requesting access to the switch for one clock cycle to transmit a single word and for each of the ingress ports having an activated grant request, further activating a burst signal at the ingress port, the activated burst signal indicating that the ingress port has a plurality of packet words available for transfer through the switch; and an arbiter having control logic for arbitrating among the pool of grant requests on a first interval to determine a first winning ingress port, issuing a first grant to the first winning ingress port thereby granting permission for the first winning ingress port to access the switch for one clock cycle to transmit the single word and retaining the grant request for the first winning ingress port in the arbitration pool after the first grant has been issued if the first winning ingress port has as active burst signal or removing the grant request for the first winning ingress port from the arbitration pool after the first grant has been issued if the first winning ingress port does not have an active burst signal and arbitrating among the grant requests on a subsequent interval to determine a subsequent winning ingress port, and if the subsequent winning ingress port is the first winning ingress port and the burst signal for the first winning ingress port is activated, issuing a subsequent grant to the subsequent winning ingress port thereby granting permission for the subsequent winning ingress port to access the switch for one clock cycle to transmit the single word wherein the subsequent grant is issued prior to the winning ingress port validating the first grant that was issued to the first winning ingress port.

27. The system of claim 26, wherein at least one grant request from at least one of the plurality of ingress ports indicates at least one egress port to which a connection is required through the switch and a packet priority.

28. The system of claim 26, wherein each of the grant requests further comprises a packet priority and wherein the first winning ingress port is the ingress port having the grant request with the highest packet priority.

29. The system of claim 26, wherein each of the grant requests further comprises a packet priority and wherein the first winning ingress port is the ingress port as determined by a round robin arbitration method among the grant requests having the same packet priority.

30. The system of claim 26, wherein each of the grant requests further comprises a packet priority and wherein the subsequent winning ingress port is the ingress port having the grant request with the highest packet priority.

31. The system of claim 26, wherein each of the grant requests further comprises a packet priority and wherein the subsequent winning ingress port is the ingress port as determined by a round robin arbitration method among the grant requests having the same packet priority.

32. The system of claim 26, wherein the burst signal at each of the ingress ports has a burst signal length equal to the number of words available for transfer at the ingress port.

33. The system of claim 32, wherein the burst signal length is equal to two.

34. The system of claim 32, wherein the burst signal length is greater than two.

35. The system of claim 26, wherein validating the first grant request further comprises receiving the issued grant at the winning ingress port and reactivating the grant request at the winning ingress port.

36. The system of claim 26, further comprising the ingress port for deactivating the burst signal when only one word is available at the ingress port for transfer through the switch.

37. The system of claim 26, further comprising an input state machine positioned between the receive buffer and the ingress port of the switch, the input state machine having control logic to determine if a word presented by the receive buffer is serviceable by the switch.

* * * * *